US009069960B1

(12) United States Patent
Kumar (10) Patent No.: US 9,069,960 B1
(45) Date of Patent: Jun. 30, 2015

(54) SYSTEM, METHOD, AND COMPUTER PROGRAM PRODUCT FOR AVOIDING AN ON-ACCESS SCAN OF DATA ACCESSIBLE BY A COLLABORATIVE PORTAL APPLICATION AFTER AN ON-DEMAND SCAN

(75) Inventor: Basant Kumar, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1573 days.

(21) Appl. No.: 11/849,120

(22) Filed: Aug. 31, 2007

(51) Int. Cl.
*G06F 21/56* (2013.01)

(52) U.S. Cl.
CPC .............. *G06F 21/56* (2013.01); *G06F 21/562* (2013.01)

(58) Field of Classification Search
CPC ..... G06F 21/56; G06F 21/562; G06F 21/564; G06F 21/566; H04L 63/145
USPC ................................ 726/22, 24; 713/188, 189
See application file for complete search history.

(56) References Cited

U.S. PATENT DOCUMENTS

| | | | | |
|---|---|---|---|---|
| 6,094,731 | A * | 7/2000 | Waldin et al. | 714/38.14 |
| 6,611,925 | B1 * | 8/2003 | Spear | 714/38.14 |
| 6,735,700 | B1 | 5/2004 | Flint et al. | 713/200 |
| 6,763,466 | B1 * | 7/2004 | Glover | 726/24 |
| 7,058,975 | B2 * | 6/2006 | Edwards et al. | 726/22 |
| 7,096,368 | B2 * | 8/2006 | Kouznetsov et al. | 713/189 |
| 7,251,830 | B1 * | 7/2007 | Melchione | 726/24 |
| 7,739,738 | B1 * | 6/2010 | Sobel et al. | 726/24 |
| 8,099,785 | B1 * | 1/2012 | Pavlyushchik | 726/24 |
| 8,115,769 | B1 * | 2/2012 | Lymer et al. | 345/440 |
| 8,307,428 | B1 * | 11/2012 | Hearnden et al. | 726/22 |
| 2002/0016925 | A1 * | 2/2002 | Pennec et al. | 713/201 |
| 2003/0023864 | A1 * | 1/2003 | Muttik et al. | 713/200 |
| 2003/0074574 | A1 * | 4/2003 | Hursey et al. | 713/200 |
| 2003/0120952 | A1 | 6/2003 | Tarbotton et al. | 713/201 |
| 2008/0019352 | A1 * | 1/2008 | Bennett | 370/352 |
| 2008/0147612 | A1 * | 6/2008 | Gryaznov | 707/3 |

OTHER PUBLICATIONS

"Kolab 2—Free Software Groupware Project" by Erlewein, Frank, Konold & Partner, published Oct. 18, 2004 and located at www.kolab.org/doc/concept-draft-cvs20060921.pdf.*
"The 100 Best Products of 2007" by Eric Dahl (May 21, 2007); 4 pages; originally converted to PDF from http://www.pcworld.com/article/131935-14/the_100_best_products_of_2007.html.*
"About VirSCAN" by VirSCAN.org (Jul. 17, 2007); 1 page; downloaded from http://www.virscan.org/ via http://classic-web.archive.org/web/20070717234327/http://www.virscan.org/.*
"Free Sites Double-check Your Antivirus Program" by Steve Bass (Jan. 19, 2007); 1 page; originally converted to PDF from http://blogs.pcworld.com/tipsandtweaks/archives/003589.html.*
"CompTIA A+ Certification All-In-One Desk Reference for Dummies" by Glen E. Clarke and Ed Tetz (Jan. 30, 2007); 1176 pages (truncated to 1 relevant page).*

(Continued)

*Primary Examiner* — Chau Le
(74) *Attorney, Agent, or Firm* — Wong, Cabello, Lutsch, Rutherford & Brucculeri LLP.

(57) ABSTRACT

A system, method, and computer program product are provided for avoiding an on-access scan of data after an on-demand scan of the data. In use, an on-demand scan is performed on data accessible by a collaborative portal application. Further, an on-access scan of the data is avoided, after the on-demand scan.

31 Claims, 5 Drawing Sheets

(56) References Cited

OTHER PUBLICATIONS

"Certification authority database" by Microsoft (Jan. 21, 2005); 1 page; converted to PDF originally from http://technet.microsoft.com/en-us/library/cc758139(WS.10).aspx.*

"The Quick Guide to GUIDs" by BetterExplained (Apr. 18, 2007); 5 pages; converted to PDF originally from http://betterexplained.com/articles/the-quick-guide-to-guids/.*

"How do I Choose an Anti-Virus Software?" by Rick Smith (Oct. 1998); 3 pages; converted to PDF originally from http://www.reviewsonline.com/ANTIVS.htm.*

"CompTIA A+ Certification All-In-One Desk Reference for Dummies" (Jan. 30, 2007) by Glen E. Clarke and Ed Tetz ; 1176 pages (truncated to 1 relevant page).*

"Databasics II: Creating your first database" by Rose Vines (2001); 5 pages; converted to PDF originally from http://www.geekgirls.com/databasics_02.htm.*

"OPSWAT Metascan—Your super antivirus and content filtering engine" (2009) by OPSWAT; 4 pages; originally downloaded from http://www.opswat.com/sites/default/files/Metascan_brochure.pdf.*

"About VirSCAN" (Jul. 17, 2007) by VirSCAN.org; 2 pages (second copy enlarged); converted to PDF from http://www.virscan.org/ via http://www.archive.org/.*

"Database" and "record," Microsoft Computer Dictionary, Fifth Edition, 2002, 3 pages.*

"Microsoft Forefront Security for SharePoint: Features," Microsoft Corporation, Nov. 14, 2006.

U.S. Appl. No. 12/024,240, filed Feb. 1, 2008.

* cited by examiner

CONFIGURATION DATA TABLE

| VENDOR ID | PRODUCT NAME | VERSION |
|---|---|---|
| 1 | SCANNER SYSTEM_01 | A |
| 2 | SCANNER SYSTEM_01 | B |
| 3 | SCANNER SYSTEM_02 | A |

FIGURE 5A

DOCUMENT DATA TABLE

| DOCUMENT ID | VENDOR ID | STATUS |
|---|---|---|
| RECORD_01 | 1 | CLEAN |
| RECORD_02 | 2 | CLEAN |
| RECORD_03 | 3 | UNWANTED |

FIGURE 5B

SYSTEM, METHOD, AND COMPUTER PROGRAM PRODUCT FOR AVOIDING AN ON-ACCESS SCAN OF DATA ACCESSIBLE BY A COLLABORATIVE PORTAL APPLICATION AFTER AN ON-DEMAND SCAN

FIELD OF THE INVENTION

The present invention relates to identifying unwanted data, and more particularly to performing on-access and on-demand scans for unwanted data.

BACKGROUND

Security systems have generally been developed for detecting unwanted data. For example, unwanted data has generally included viruses, Trojans, etc. Oftentimes, such security systems include scanners for detecting unwanted data by scanning for known unwanted data. However, such scanning security systems have generally exhibited various limitations in situations where an on-access scan is performed after an on-demand scan.

For example, traditional scanning security systems are capable of avoiding multiple on-access scans when such scans utilize the same known unwanted data, thus preventing duplicate scans. However, such scanning security systems have been unable to avoid an on-access scan after an on-demand scan when such scans utilize the same known unwanted data. To this end, scanning security systems continue to be inefficient by performing duplicate scans of data in such situations.

There is thus a need for addressing these and/or other issues associated with the prior art.

SUMMARY

A system, method, and computer program product are provided for avoiding an on-access scan of data accessible by a collaborative portal application after an on-demand scan of the data. In use, an on-demand scan is performed on data accessible by a collaborative portal application. Further, an on-access scan of the data is avoided, after the on-demand scan.

DETAILED DESCRIPTION

Figure 1:
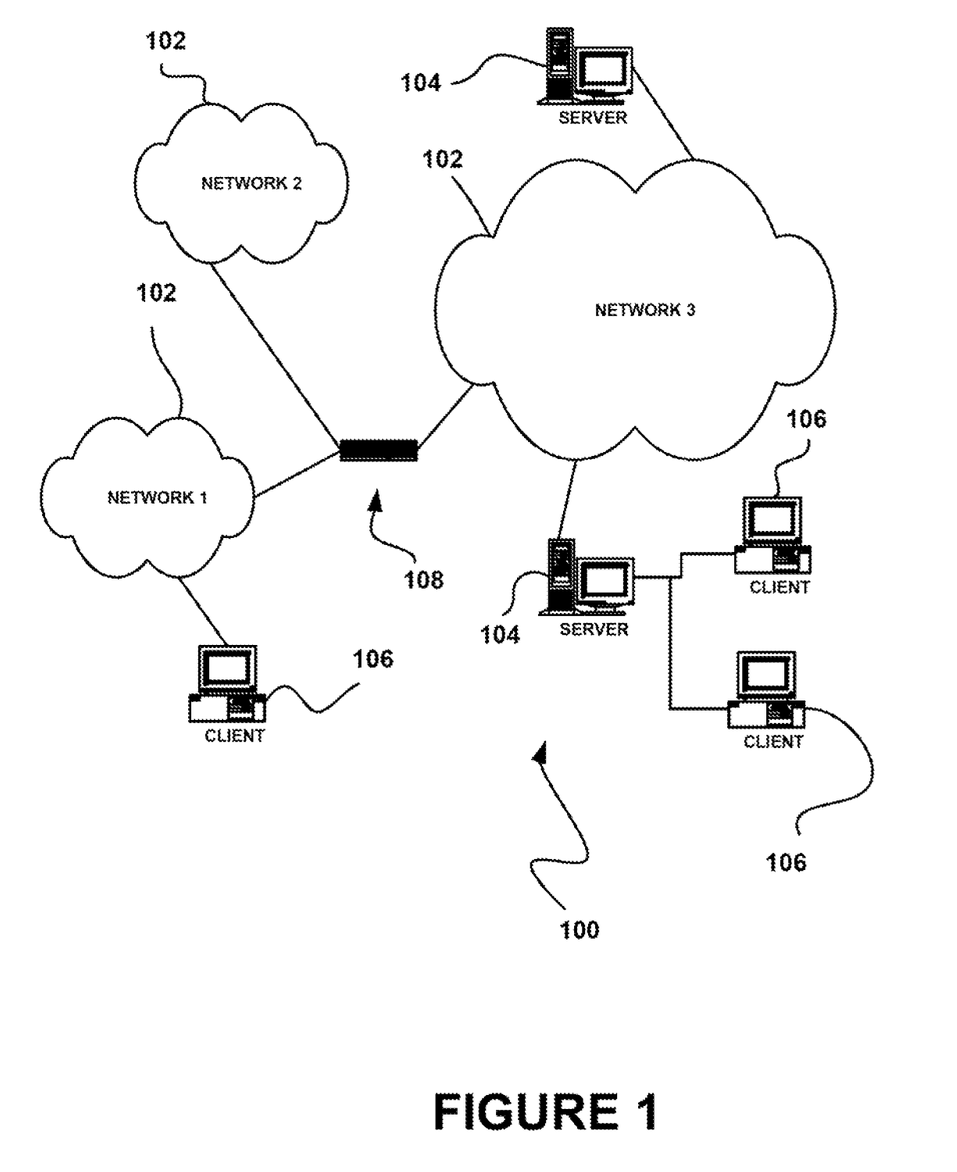
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
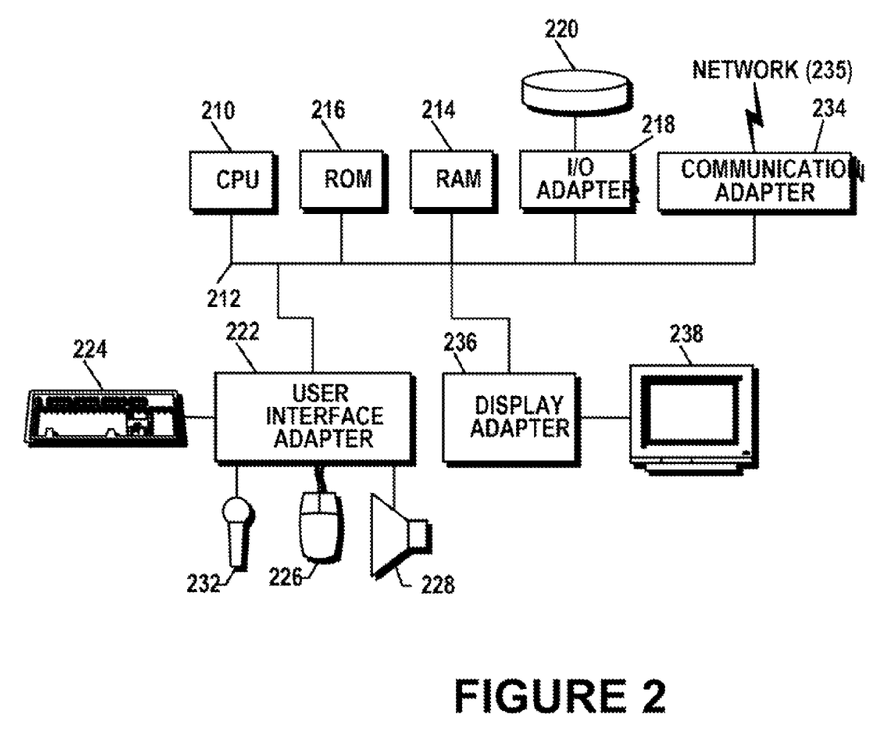
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
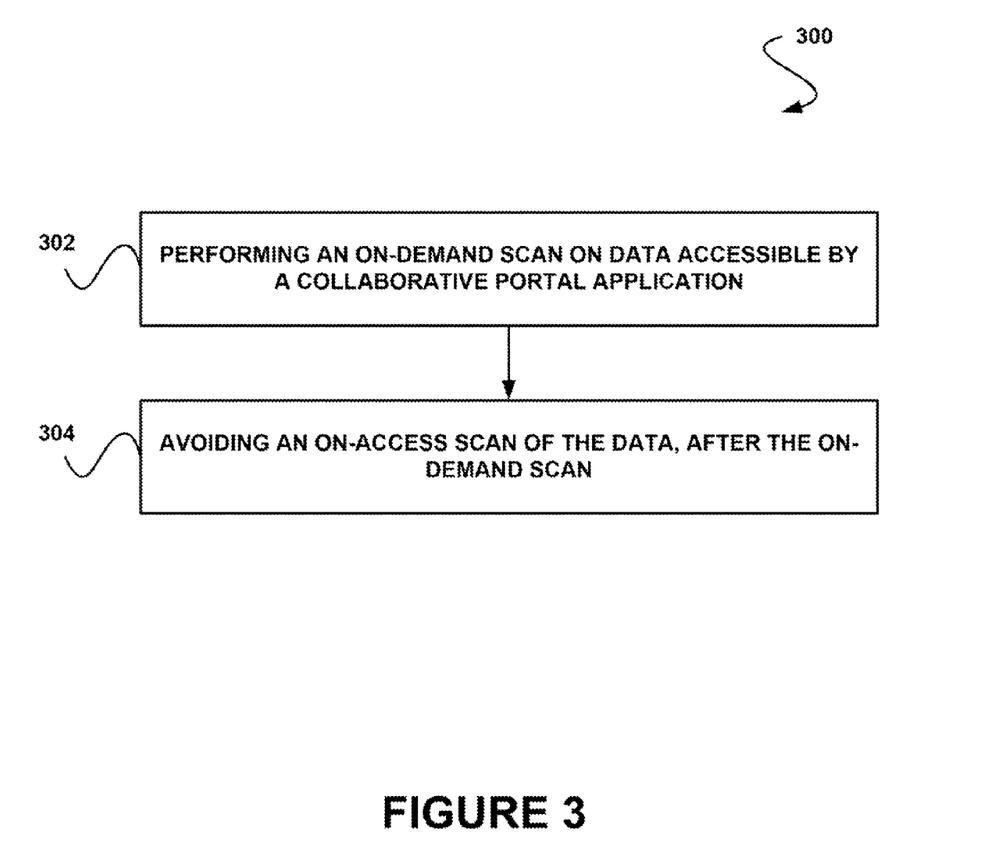
FIG. 3 shows a method for avoiding an on-access scan of data accessible by a collaborative portal application after an on-demand scan of the data, in accordance with one embodiment.

FIG. 3 shows a method 300 for avoiding an on-access scan of data accessible by a collaborative portal application after an on-demand scan of the data, in accordance with one embodiment. As an option, the method 300 may be carried out in the context of the architecture and environment of FIGS. 1 and/or 2. Of course, however, the method 300 may be carried out in any desired environment.

As shown in operation 302, an on-demand scan is performed on data accessible by a collaborative portal application. In the context of the present description, the data may include any information, code, etc. capable of being scanned. For example, the data may be capable of being scanned by a scanning security system (e.g. anti-virus scanner, etc.). In various embodiments, the data may include any one or more files, electronic mail (email) messages, programs, etc.

Further, the data may be stored on a portal server. Such portal server may include a point of access to information associated with various sources, in one embodiment. To this end, the portal server may include a data repository for storing a plurality of different data. Just by way of example, the portal server may include the Microsoft) SharePoint® server. In other optional embodiments, the data may be stored on any desired device (e.g. any of the devices described above with respect to FIG. 1 and/or 2).

Accordingly, the collaborative portal application may include an application capable of interfacing with the portal server [e.g. an application program interface (API), etc.], as an option. For example, the collaborative portal application may be utilized for accessing the data stored on the portal server. Of course, however, the collaborative portal application may include any application capable of being utilized for accessing data via a collaborative portal. Moreover, such access may include reading, writing, communicating, and/or any other access possible with respect to the data.

Still yet, with respect to the present description, the on-demand scan may include any scan capable of being performed on-demand. In one embodiment, the on-demand scan may be automatically performed based on a schedule. Optionally, such schedule may be user-configured. For example, the on-demand scan may be automatically performed based on a time of day, a current amount of resources utilized, etc.

In another embodiment, the on-demand scan may be performed based on a manual selection. Just by way of example, a user may manually select an option to scan the data, such that the on-demand scan is performed in response to such selection. Optionally, the manual selection may be made utilizing a user interface of a security system capable of performing the on-demand scan.

Additionally, performing the on-demand scan on the data may, in one possible embodiment, include scanning the data for known unwanted data. Such known unwanted data may include any data predetermined to be unwanted. For example, the known unwanted data may include at least one signature of data predetermined to be unwanted (e.g. virus signatures, intrusion signatures, etc.). As an option, the known unwanted data may be stored in a file of known unwanted data (e.g. a DAT), may be stored with respect to an engine utilized for the on-demand scan, etc.

In one embodiment, the on-demand scan may include comparing the data to the known unwanted data. As an option, the data may be accessed utilizing the collaborative portal application for comparison of the data to the known unwanted data. As another option, the data may be directly accessed for comparison of the data to the known unwanted data. For example, the data may be directly accessed by opening a database of the data, retrieving a record set of the data from the database and extracting a data stream of the data from the record set. Thus, the on-demand scan may identify whether the data is unwanted (e.g. includes a virus, spyware, a Trojan, a worm, etc.). Optionally, an action may be performed in response to the on-demand scan (e.g. a user may be notified of results of the on-demand scan, the data may be quarantined and/or cleaned, etc.).

As also shown, an on-access scan of the data is avoided, after the on-demand scan. Note operation 304. In the context of the present description, the on-access scan may include scanning the data based on (e.g. in response to, etc.) a request to access the data. For example, the on-access scan may be performed in response to a request (e.g. by a user, by an application, etc.) to access the data. Further, avoiding the on-access scan may, in one embodiment, include preventing initiation of the on-access scan on the data and/or any other technique whereby the on-access scan is avoided, at least in part.

In one embodiment, the on-access scan may be performed utilizing the collaborative portal application. Just by way of example, the collaborative portal application may be utilized for accessing the data, such that the data may be scanned via the on-access scan. Further, the on-access scan may be capable of being performed utilizing a security system, such as the same or different security system utilized for performing the on-demand scan.

In another embodiment, the on-access scan of the data may be avoided, after the on-demand scan, in response to a determination that the on-access scan will utilize a version of known unwanted data utilized by the on-demand scan. Accordingly, prior to avoiding the on-access scan, it may be determined whether the on-access scan will utilize the version of known unwanted data utilized by the on-demand scan. Such version may indicate whether the known unwanted data includes a latest (e.g. updated, etc.) set of known unwanted data.

In this way, an on-access scan of the data which is repetitive of a previously performed on-demand scan of the data may be avoided, for efficiency purposes. For example, in one embodiment, delay in accessing the data may be prevented. In another example, resource (e.g. CPU, memory, etc.) consumption associated with performance of the on-access scan may be limited. Further, potential failure of the on-access scan due to scanning data of a large size may be eliminated. In some embodiments, eliminating the potential of failure of the on-access scan may further prevent any resultant recreation of the data, monopolization of resources causing denial of the resources to other processes, hanging of a server on which the data is stored, etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
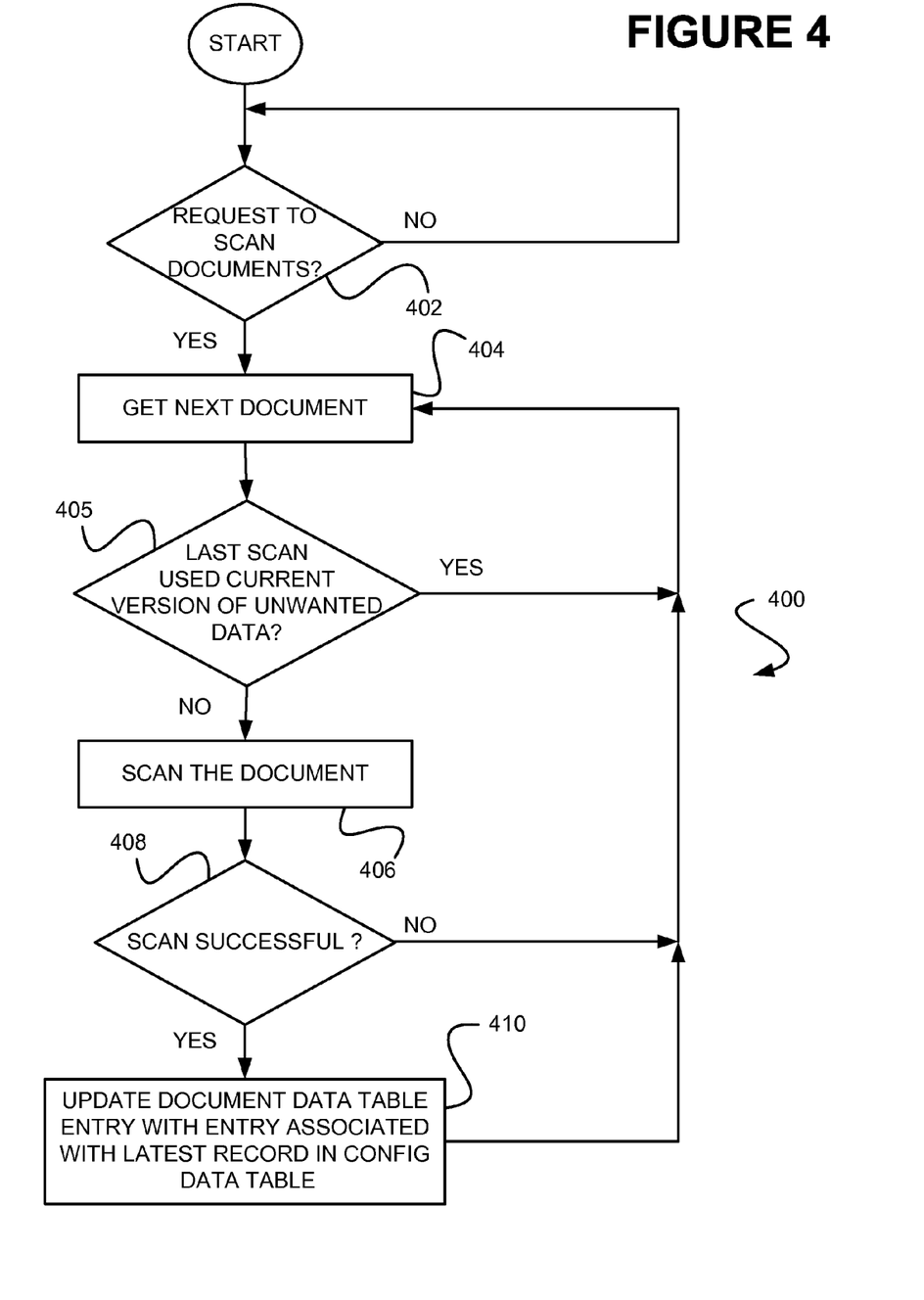
FIG. 4 shows a method for updating a data table entry associated with data in response to a successful scan of the data, in accordance with another embodiment.

FIG. 4 shows method 400 for updating a data table entry associated with data in response to a successful scan of the data, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether a request to scan documents has been issued. In the context of the present embodiment, the request may include an on-access request or an on-demand request to scan the documents utilizing a version of known unwanted data not utilized during a previous on-access scan or on-demand scan of the documents. Thus, the request may only be issued if such scan will utilize a version of known unwanted data not previously utilized to scan the documents.

In one embodiment, the version of known unwanted data to be utilized for scanning the documents may be identified from a version identifier indicated by a set (e.g. file, etc.) of known unwanted data. Such set of known unwanted data may optionally include known unwanted data most recently received (e.g. downloaded, etc.) for use during scanning of the documents.

As an option, the version may be identified in a table (e.g. a configuration data table). For example, the configuration data table may include a plurality of records each including an entry indicating a different version of received known unwanted data. To this end, the configuration data table may be updated with a new record when updated known unwanted data is received.

Further, the new record may include a unique entry indicating the version of the updated known unwanted data. Optionally, the unique entry may include a value automatically incremented from a value included in a previous record of the configuration data table. Thus, an entry of a latest record of the configuration data table may indicate a latest version of known unwanted data capable of being utilized for scanning the documents. Of course, however, the version may be identified in any manner.

Further, the version of known unwanted data utilized by the previous scan may be identified in another table (hereinafter document data table). As an option, the document data table may be included in a database separate from the database in which the configuration data table is stored. For example, each document may include an entry in the document data table indicating a last version utilized for scanning the document. Thus, such entry may be updated (e.g. to reflect the version of the known unwanted data utilized) in response to the performance of a scan of the data.

To this end, a latest version of known unwanted data to be utilized for scanning the documents (in response to the request) may be compared with a version of known unwanted data utilized during a previous scan of such documents. The request to scan the documents may optionally only be issued with respect to documents for which the latest version of known unwanted data is different (e.g. updated) from the version of known unwanted data used during the previous scan of such documents.

In response to a determination that the request to scan the documents has been issued, a next document is retrieved. Note operation 404. The next document may include any document indicated by the request. For example, the request may indicate a list of documents to be scanned, such that the next document may include the first document in the list that has yet to be scanned. Thus, if none of the documents in the list have been scanned, the first document in the list may be retrieved.

In one embodiment, the next document may be retrieved indirectly. For example, the next document may be retrieved from a portal server utilizing a collaborative portal application. In another embodiment, the next document may be retrieved directly. Just by way of example, the document data table may include an entry for such document, such that a data stream in the document may be retrieved from the associated entry.

Further, the next document may optionally be retrieved utilizing a device separate from a device on which the next document is stored (e.g. the portal server, etc.). In one embodiment, the device used to retrieve the next document may be capable of performing the scan of the next document. Of course, it should be noted that the document may be retrieved in any desired manner.

In operation 405 it is determined if the last scan of the document was made using the current version of the unwanted data. This is done by obtaining the document's unwanted data version entry from the document data table and comparing the stored last version indication with the current version information. If the versions are the same, the scan can be omitted. Otherwise the document may be scanned.

Additionally, as shown in operation 406, the retrieved document is scanned. Scanning the retrieved document may include comparing the retrieved document to known unwanted data. With respect to the present embodiment, such known unwanted data may be included within the latest version of known unwanted data (e.g. within the configuration data table). Optionally, the known unwanted data may be stored on a device utilized for scanning the retrieved document.

Further, scanning the retrieved document may include determining whether the retrieved document matches the any of the known unwanted data. Such determination may be based on the comparison, for example. As an option, a determination that the retrieved document matches the known unwanted data may indicate that the retrieved document is unwanted.

Still yet, it is determined whether the scan of the retrieved document is successful, as shown in decision 408. Just by way of example, the scanning may be successful if the retrieved document is compared to each different known unwanted data in the latest version of known unwanted data. Thus, the scanning may be successful if such scan is uninterrupted, not terminated, etc. Of course, however, any measure of success may be utilized for determining whether the scan of the retrieved document is successful.

In response to a determination that the scan of the retrieved document is successful, an entry in the document data table is updated utilizing an entry of a latest record of the configuration data table. Note operation 410. For example, the entry of the latest record of the configuration data table may indicate the most recently received version of known unwanted data, which was utilized to scan the document. In this way, the entry in the document data table may be updated to reflect that the document associated with such entry has been scanned utilizing the latest version of known unwanted data.

In one embodiment, the entry in the document data table may be updated by writing over a previous entry in the document data table. For example, such previous entry may reflect that the document associated with such entry was previously scanned utilizing an older version of known unwanted data. In another embodiment, the entry in the document data table may be updated utilizing a command.

Table 1 shows one example of a structured query language command capable of being utilized for updating the entry in the document data table. It should be noted that such command is set forth for illustrative purposes only, and thus should not be construed as limiting in any manner.

Table 1

//where virusvendorid is the entry in the document data table that
represents a version of known unwanted data utilized during a last scan of the document
//where VendorID is the entry in the configuration data table that represents the latest received version of known unwanted data capable of being utilized for scanning the document
//where Config DB Name is the name of the database in which the configuration data table is located
//where antivirusvendors is name of the configuration data table
Update does set virusvendorid=(select MAX(VendorID) from <Config DB Name>.dbo.antivirusvendors) where leafname::: <File name>

Thus, by updating the entry in the document data table to indicate the version of the known unwanted data utilized to scan the document (in operation 406), the document may be prevented from being subsequently scanned (based on an on-access request or an on-demand request) utilizing such indicated version of the known unwanted data. Furthermore, in response to updating the entry in the document data table, a next document to be scanned is retrieved (operation 404).

Accordingly, for each document successfully scanned, an associated entry in the document data table may be updated to indicate the version of the known unwanted data utilized for such scan.

Also, as shown in decision 408, if it is determined that the scan was not successful, the next document may be retrieved (operation 404). To this end, entries in the document data table may not be updated for documents in which a scan utilizing the latest version of known unwanted data is unsuccessful. Thus, only documents scanned successfully may be prevented from being subsequently scanned utilizing the same version of known unwanted data.

Figure 5A:
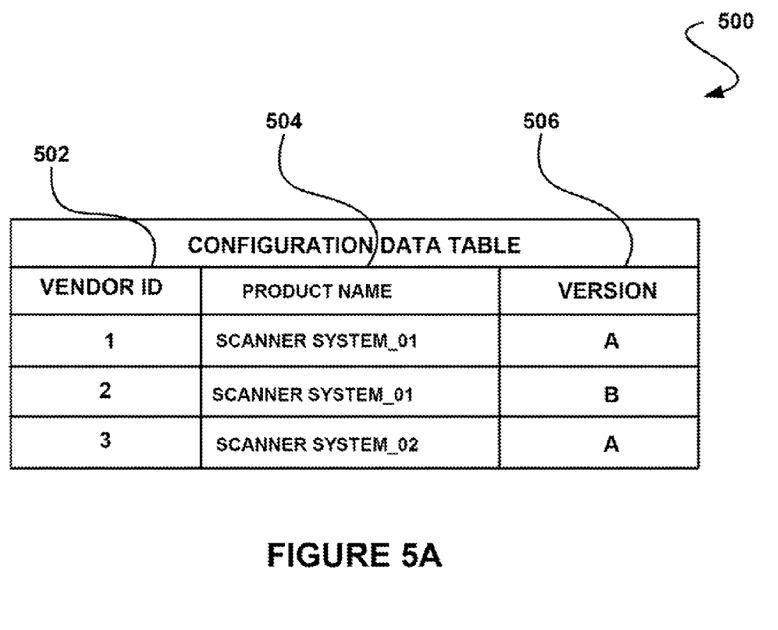
FIG. 5A shows a table with entries associated with updates to known unwanted data, in accordance with yet another embodiment.

FIG. 5A shows a table 500 with entries associated with updates to known unwanted data, in accordance with yet another embodiment. As an option, the table 500 may be utilized in the context of the architecture and environment of FIGS. 1-4. For example, the table 500 may include the configuration data table described above with respect to FIG. 4. Of course, however, the table 500 may be utilized in any desired environment. Again, it should also be noted that the aforementioned definitions may apply during the present description.

As shown, the table 500 includes a Vendor ID entry 502 for each record in the table 500. The vendor identifier (ID) entry 502 may store a unique value indicating a latest version of received known unwanted data capable of being utilized for scanning data. In addition, the vendor ID entry 502 may be incremented (e.g. by 1, etc.) for each new record.

Thus, in response to receipt of a new version of known unwanted data, a new record may be created in the table 500. As an option, the new record may be created by an API associated with a security system utilized for scanning data. Further, the vendor ID entry 502 associated with the new record may include a value automatically incremented from the vendor ID entry 502 of the record immediately previous to the new record.

The table 500 also includes a product name entry 504 for each record. The product name entry 504 may store a name of the security system. As another option, the product name entry 504 may store a name of a provider of the security system. In one embodiment, the name may be identified utilizing the received new version of known unwanted data. For example, the received new version of known unwanted data may indicate the name of the security system, provider, etc.

Moreover, the table 500 includes a version entry 506 for each record. The version entry 506 may store an indicator of the version of the known unwanted code associated with each record. For example, the version entry 506 of a record may identify a version of the known unwanted code from which the record was created. As an option, the version may be a version identifier assigned by the provider of the known unwanted data (e.g. which may be the same as the provider of the security system). As another option, the version may be identified utilizing the received new version of known unwanted data.

In one embodiment, the configuration data table may be utilized for identifying a latest version of known unwanted data to be utilized during scanning of data. For example, the latest created record may indicate such latest version of known unwanted data. As another example, the highest value in the vendor ID entries 502 may indicate the latest version of known unwanted data.

Figure 5B:
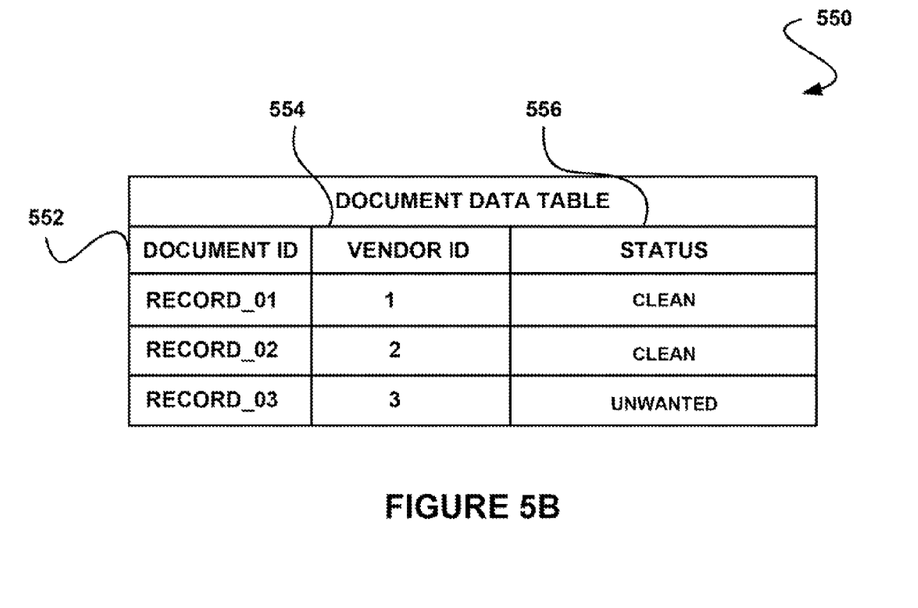
FIG. 5B shows a table with entries associated with data, in accordance with still yet another embodiment.

FIG. 5B shows a table 550 with entries associated with data, in accordance with yet another embodiment. As an option, the table 550 may be implemented in the context of the architecture and environment of FIGS. 1-4. For example, the table 550 may include the document data table described above with respect to FIG. 4. Of course, however, the table 550 may be implemented in any desired environment. Again, it should also be noted that the aforementioned definitions may apply during the present description.

As shown, the table 550 includes a document ID entry 552 for each record in the table 550. Each record may be associated with different data (e.g. a different document), such that the document ID entry 552 may indicate the data with which the record is associated. In this way, the document ID entry 552 may be unique for each record in the table 550. Optionally, each of the different data indicated by the records in the table 550 may include data updated to a portal server.

Additionally, the table 550 includes a vendor ID entry 554 for each record. For each record, the vendor ID entry 554 may indicate a version of known unwanted data utilized during a last scan of the associated data. In one embodiment, the vendor ID entry 554 may be updated after scanning the data based on the vendor ID entry associated with the latest record in the configuration data table (e.g. see item 502 of FIG. 5A).

Further, the table 550 includes a status entry 556 for each record. The status entry 556 may indicate the results of a latest scan of the data associated with a record. Just by way of example, the status entry 556 may indicate that the data is clean (e.g. does not match known unwanted data), unwanted (e.g. matches known unwanted data), etc. As an option, the status entry 556 may include the value "0" for indicating the data is clean, and the value "1" for indicating that the data is unwanted.

In one exemplary embodiment, the table 500 (hereinafter configuration data table 500) and the table 550 (hereinafter document data table 550) may be utilized for determining whether to avoid an on-access scan after an on-demand scan has been performed. The determination may be made with respect to any time period in which data may be accessed, thus potentially initiating the on-access scan, after the on-demand scan.

Initially, data may be requested to be accessed. In the context of the present example, such data may include data previously scanned based on an on-demand scan. In response to such request, a version of known unwanted data utilized during a latest scan of the data may be identified, utilizing the document data table 550. For example, a document ID of the data may be utilized to identify a record associated with the data in the document data table 550. Thus, the document ID of the data may be matched to a document ID entry 552 in the document data table 550.

Utilizing the identified record associated with the data, the version of known unwanted data utilized during a latest scan of the data may be identified. For example, the vendor ID entry 554 associated with the identified record, which indicates such version of known unwanted data, may be read. Furthermore, the identified vendor ID entry 554 may be compared with a latest version of known unwanted data indicated by the configuration data table 500.

The latest version of known unwanted data indicated by the configuration data table 500 may be determined by identifying a latest record created in the configuration data table 500. Moreover, the vendor ID entry 502 associated with such identified record may indicate the latest version of known unwanted data. Accordingly, the identified vendor ID entry 502 of the configuration data table 500 may be compared with the identified vendor ID entry 554 of the document data table 550.

Based on such comparison, it may be determined whether the data requested to be accessed has previously been scanned utilizing the latest version of the known unwanted data. For example, if the identified vendor ID entry 502 of the configuration data table 500 matches the identified vendor ID entry 554 of the document data table 550, such match may indicate that the data requested to be accessed has previously been scanned utilizing the latest version of the known unwanted data. To this end, an on-access scan of the data in response to the request to access the data may be avoided, in response to a determination that the data has previously been scanned utilizing the latest version of the known unwanted data.

In one optional embodiment, an on-demand scan of data may be performed when resource usage is below a predetermined threshold (e.g. as configured by a user, etc.). In this way, use of resources for purposes other than scanning may not necessarily be affected by the on-demand scan. Further, an on-access scan of data may be avoided when the data has been previously scanned by the on-demand scan utilizing the latest version of known unwanted data, therefore even eliminating resource consumption due to on-access scanning of the data.

In another optional embodiment, a notification may be presented to a user in response to receipt of a new version of known unwanted code. For example, the notification may request that the user initiate an on-demand scan which utilizes such new version of known unwanted code. Thus, subsequent on-access scans resulting from requests to access data may be prevented by previously executing the on-demand scan, until another new version of known unwanted code is received.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    scanning, by a programmable control device, a data element for a known unwanted data and placing an entry corresponding to the data element in a table external to the data element, said table including a plurality of entries, at least one entry corresponding to each data element scanned for the known unwanted data, each entry including information identifying the data element and a version of the known unwanted data used in the scan of the data element, wherein scanning and placing the entry does not modify the data element;
    receiving, at the programmable control device, a request to scan the data element;
    retrieving, by the programmable control device, in response to receiving said request, the entry from the table identifying the version of the known unwanted data used when the data element was previously scanned, wherein the entry is retrieved from the plurality of entries in the table utilizing a document identifier of the data element, wherein said retrieving the entry is performed without accessing the data element;
    determining, by the programmable control device, in response to receiving said request, if a current version of the known unwanted data is equal to the version of the known unwanted data used when the data element was previously scanned; and
    omitting, by the programmable control device, scanning of the data element in response to a determination of equal versions of the known unwanted data.

2. The method of claim 1, wherein said scanning is performed in response to a determination of different current and retrieved versions of known unwanted data.

3. The method of claim 1, wherein said scanning is performed on demand.

4. The method of claim 1, wherein said scanning is automatically performed based on a schedule.

5. The method of claim 1, wherein said scanning is performed based on a user request.

6. The method of claim 1, wherein said scanning is performed in response to a request to access the data element.

7. The method of claim 1, wherein said request is received in response to a request to access the data element.

8. The method of claim 1, wherein said request is an on demand request to scan the data element.

9. The method of claim 1, further comprising:
    providing, by the programmable control device, a second table external to the data element with a plurality of entries, at least one entry for each version of the known unwanted data, and
    wherein said step of scanning and placing uses a last entry in said second table as the version of the known unwanted data.

10. The method of claim 9, wherein an entry is added to said second table in response to receiving an updated version of the known unwanted data.

11. The method of claim 1, wherein the programmable control device comprises one or more communicatively coupled programmable control devices.

12. A non-transitory computer readable medium storing executable instructions to cause a processor to:
    scan a data element for a known unwanted data and place an entry corresponding to the data element in a table external to the data element, said table including a plurality of entries, at least one entry corresponding to each data element scanned for the known unwanted data, each entry including information identifying the data element and a version of the known unwanted data used in the scan of the data element, wherein scanning and placing the entry does not modify the data element;
    receive a request to scan the data element;
    retrieve, in response to receiving said request, the entry from the table identifying the version of the known unwanted data used when the data element was previously scanned, wherein the entry is retrieved from the plurality of entries in the table utilizing a document identifier of the data element, wherein said retrieval of the entry is performed without accessing the data element;
    determine, in response to receiving said request, if a current version of the known unwanted data is equal to the version of the known unwanted data used when the data element was previously scanned; and
    omit scanning of the data element in response to a determination of equal versions of the known unwanted data.

13. The non-transitory computer readable medium of claim 12, wherein said executable instructions to cause a processor to scan comprise instructions to cause a processor to scan in response to a determination of different current and retrieved versions of known unwanted data.

14. The non-transitory computer readable medium of claim 12, wherein said executable instructions to cause a processor to scan comprise instructions to cause a processor to scan is performed on demand.

15. The non-transitory computer readable medium of claim 12, wherein said executable instructions to cause a processor to scan comprise instructions to cause a processor to automatically scan based on a schedule.

16. The non-transitory computer readable medium of claim 12, wherein said executable instructions to cause a processor to scan comprise instructions to cause a processor to scan based on a user request.

17. The non-transitory computer readable medium of claim 12, wherein said executable instructions to cause a processor to scan comprise instructions to cause a processor to scan in response to a request to access the data element.

18. The non-transitory computer readable medium of claim 12, wherein said executable instructions to cause the processor to receive a request to scan a data element comprise instructions to cause the processor to receive a request to scan a data element in response to a request to access the data element.

19. The non-transitory computer readable medium of claim 12, wherein said executable instructions to cause the processor to receive a request to scan a data element comprise instructions to cause the processor to receive an on demand request to scan the data element.

20. The non-transitory computer readable medium of claim 12 further comprising executable instructions to cause a processor to:
    provide a second table external to the data element with a plurality of entries, at least one entry for each version of the known unwanted data, and
    wherein said instructions to cause a processor to scan and place comprise instructions to cause the processor to scan and place using a last entry in said second table as the version of the known unwanted data.

21. The non-transitory computer readable medium of claim 20, further comprising executable instructions to cause the processor to add an entry to said second table in response to receiving an updated version of the known unwanted data.

22. A system comprising:
    a processor for executing software; and
    a memory to store software that when executed causes said processor to:
        scan a data element for a known unwanted data and place an entry corresponding to the data element in a table external to the data element, said table including a plurality of entries, at least one entry corresponding to each data element scanned for the known unwanted data, each entry including information identifying the data element and a version of the known unwanted data used in the scan of the data element, wherein scanning and placing the entry does not modify the data element;
        retrieve, in response to receiving a request to scan the data element, the entry from the plurality of entries in the table identifying the version of the known unwanted data used when the data element was previously scanned, wherein the entry is retrieved from the table utilizing a document identifier of the data element, wherein said retrieval of the entry is performed without accessing the data element;
        determine, in response to receiving the request to scan the data element, if a current version of the known unwanted data is equal to the version of the known unwanted data used when the data element was previously scanned; and
        omit scanning of the data element in response to a determination of equal versions of the known unwanted data.

23. The system of claim 22, wherein said scan is performed in response to a determination of different versions of known unwanted data.

24. The system of claim 22, wherein said scan is performed on demand.

25. The system of claim 22, wherein said scan is automatically performed based on a schedule.

26. The system of claim 22, wherein said scan is performed based on a user request.

27. The system of claim 22, wherein said scan is performed in response to a request to access the data element.

28. The system of claim 22, wherein said request is received in response to a request to access the data element.

29. The system of claim 22, wherein said request is an on demand request to scan the data element.

30. The system of claim 22, wherein said software, when executed, further causes said processor to:
    provide a second table external to the data element with a plurality of entries, at least one entry for each version of the known unwanted data, and
    wherein said software that when executed causes said processor to scan and place comprises software that when executed causes said processor to scan and place using a last entry in said second table as the version of the known unwanted data.

31. The system of claim 30, wherein an entry is added to said second table in response to receiving an updated version of the known unwanted data.

* * * * *